United States Patent
Nagai et al.

(10) Patent No.: US 9,523,601 B2
(45) Date of Patent: Dec. 20, 2016

(54) HOPPER GATE OPENING AND CLOSING MECHANISM

(75) Inventors: Takayuki Nagai, Hyogo (JP); Koji Morimoto, Hyogo (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 306 days.

(21) Appl. No.: 14/009,496

(22) PCT Filed: Apr. 5, 2011

(86) PCT No.: PCT/JP2011/002021
§ 371 (c)(1),
(2), (4) Date: Dec. 30, 2013

(87) PCT Pub. No.: WO2012/137250
PCT Pub. Date: Oct. 11, 2012

(65) Prior Publication Data
US 2014/0102229 A1   Apr. 17, 2014

(51) Int. Cl.
*G01G 19/393* (2006.01)
*G01G 13/00* (2006.01)

(52) U.S. Cl.
CPC .......... *G01G 19/393* (2013.01); *G01G 13/006* (2013.01); *Y10T 74/18296* (2015.01)

(58) Field of Classification Search
CPC .......... B65D 90/623; B61D 7/16; B61D 7/18; G01G 19/393; G01G 13/006; Y10T 74/18296
USPC ...................................................... 177/25.18
See application file for complete search history.

(56) References Cited

U.S. PATENT DOCUMENTS

| 4,535,855 A | * | 8/1985 | Izumi et al. ....................... 177/1 |
| 4,705,125 A | * | 11/1987 | Yamada et al. ............ 177/25.18 |
| 5,234,128 A | * | 8/1993 | Hill .................................. 222/63 |
| 6,188,029 B1 | | 2/2001 | Miyamoto et al. |

(Continued)

FOREIGN PATENT DOCUMENTS

| EP | 0 108 648 A2 | 5/1984 |
| EP | 0 852 328 A1 | 7/1998 |

(Continued)

OTHER PUBLICATIONS

Extended European Search Report for EP 11863088.8, dated Nov. 10, 2014.

(Continued)

*Primary Examiner* — Patrick M Buechner
(74) *Attorney, Agent, or Firm* — Marshall, Gerstein & Borun LLP

(57) ABSTRACT

A mechanism for opening and closing a hopper gate of the present invention, which is used in a combination weigher which performs combination calculation based on weights of objects, to find a combination in which a total of the weights of the objects falls within an allowable range with respect to a target weight, comprises an actuator (31) for generating a driving force for opening and closing the hopper gate (14A); a transmission mechanism for transmitting the driving force to the hopper gate (14A); a detecting device (60) capable of detecting an original point of a rotary shaft of the transmission mechanism, the original point corresponding to a position in which the hopper gate (14A) is closed; and a controller (18) capable of receiving an output signal of the detecting device (60).

6 Claims, 5 Drawing Sheets

(56) References Cited

U.S. PATENT DOCUMENTS

2013/0228384 A1* 9/2013 Nagai et al. ............... 177/25.18

FOREIGN PATENT DOCUMENTS

| | | |
|---|---|---|
| JP | 10-122943 | 5/1998 |
| JP | 2004-233193 A | 8/2004 |
| JP | 3670295 B2 | 7/2005 |
| JP | 2006-125914 A | 5/2006 |
| JP | 2006-201099 A | 8/2006 |
| JP | 2011-007525 A | 1/2011 |
| JP | 2011-013003 A | 1/2011 |
| JP | 2011-064489 A | 3/2011 |

OTHER PUBLICATIONS

International Search Report for PCT/JP2011/002021, dated May 10, 2011.

* cited by examiner

HOPPER GATE OPENING AND CLOSING MECHANISM

TECHNICAL FIELD

The present invention relates to a mechanism for opening and closing a hopper gate (hopper gate opening/closing mechanism) for use in a combination weigher. Particularly, the present invention relates to a hopper gate opening/closing mechanism, which is able to estimate that objects are stuck in the hopper gate.

BACKGROUND ART

Conventionally, a combination weigher is used to combine objects which are non-uniform in weights to efficiently attain a target weight.

This combination weigher typically includes a dispersion feeder which is capable of dispersing and supplying the objects evenly to components around the dispersion feeder, a plurality of linear feeders arranged at equal intervals around the dispersion feeder, feeding hoppers arranged so as to correspond to the linear feeders, respectively, and weighing hoppers arranged so as to correspond to the linear feeders, respectively.

In the above configuration, the objects are sent from the dispersion feeder to linear troughs of the linear feeders, and the objects of a suitable amount are transported by vibration on the linear troughs by vibration components of the linear feeders and fed to the weighing hoppers coupled to load cells through the feeding hoppers, respectively. The load cells detect weights of the objects held inside of the weighing hoppers. Based on a combination of weight values of the weighing hoppers, the weighing hoppers making up an optimal combination in which the weight of the objects becomes a target weight of the objects, are selected. Then, the objects are discharged from the weighing hoppers selected to make up the combination collectively onto a collecting chute located therebelow. A packaging machine packages the collective objects.

In the combination weigher as described above, each of the feeding hoppers and the weighing hoppers includes a hopper body and a hopper gate. In some cases, when opening and closing the hopper gate, a rotational motion of an output shaft of a stepping motor is converted into an opening/closing motion of the hopper gate using a cam mechanism. For example, Patent Literature 1 discloses an example of a hopper gate opening/closing mechanism for opening and closing a hopper gate using a cam mechanism including a cam and a cam follower, and a transmission mechanism including a link member, an operation arm, etc.

CITATION LIST

Patent Literature

Patent Literature 1: Japanese Patent Publication NO. 3670295 (FIG. 4)

SUMMARY OF INVENTION

Technical Problem

However, in the case of the hopper gate opening/closing mechanism disclosed in Patent Literature 1, even when the objects are stuck in the hopper gate, the cam's displacement (movement) is not mechanically restricted. For this reason, when the objects are stuck in the hopper gate, the cam coupled to the output shaft of the stepping motor can return to a state corresponding to a position in which the hopper gate is closed, as in the case where the hopper gate is normally opened and closed. That is, in the hopper gate opening/closing mechanism disclosed in Patent Literature 1, even when the objects are stuck in the hopper gate, the stepping motor does not lose steps (step-out of the stepping motor does not occur). In other words, the hopper gate opening/closing mechanism disclosed in Patent Literature 1 is unable to estimate that the objects are stuck in the hopper gate when the hopper gate is opened and closed using the cam mechanism.

The present invention has been made under the above stated circumstances, and an object of the present invention is to provide a hopper gate opening/closing mechanism which is able to estimate that the objects are stuck in the hopper gate, when the hopper gate is opened and closed using the cam mechanism.

Solution to Problem

To solve the above described problem, according to an aspect of the present invention, there is provided a mechanism for opening and closing a hopper gate which is used in a combination weigher which performs combination calculation based on weights of objects, to find a combination in which a total of the weights of the objects falls within an allowable range with respect to a target weight, the mechanism for opening and closing the hopper gate comprising: an actuator for generating a driving force for opening and closing the hopper gate; a transmission mechanism for transmitting the driving force to the hopper gate; a detecting device capable of detecting an original point of a rotary shaft of the transmission mechanism, the original point corresponding to a position in which the hopper gate is closed; and a controller capable of receiving an output signal of the detecting device.

In accordance with this configuration, the controller in the hopper gate opening/closing mechanism according to an aspect of the present invention is able to estimate that the objects are stuck in the hopper gate when the hopper gate is opened and closed using the cam mechanism. For example, in a case where the objects are caught between the hopper gate and a hopper body, and thereby they are stuck in the hopper gate, the hopper gate cannot be closed. In this case, the rotary shaft of the transmission mechanism is configured to be inhibited from returning to the original point. This enables the controller to estimate that the objects are stuck in the hopper gate based on the output signal of the detecting device.

In the mechanism for opening and closing the hopper gate according to an aspect of the present invention, the transmission mechanism may include a cam mechanism for converting a rotational motion of the actuator into a linear motion of a link mechanism. And, a driver member of the cam mechanism may be mounted to an output shaft of the actuator which is coupled to the actuator; and a follower member of the cam mechanism may be mounted to the link mechanism.

In accordance with this configuration, in the mechanism for opening and closing the hopper gate according to an aspect of the present invention, the detecting device is able to detect the original point of the output shaft (motor shaft) of the actuator.

In the mechanism for opening and closing the hopper gate according to an aspect of the present invention, the driver member may include a first cam curved surface used to transmit the driving force to the follower member when the hopper gate is opened and a second cam curved surface used to transmit the driving force to the follower member when the hopper gate is closed.

In the mechanism for opening and closing the hopper gate according to an aspect of the present invention, a cam follower may be used as the follower member, and a cam with which the cam follower contacts may be used as the driver member. And, the cam may be configured to guide the cam follower to a region between the first cam curved surface and the second cam curved surface, when the hopper gate is being opened and closed.

In accordance with this configuration, in the mechanism for opening and closing the hopper gate according to an aspect of the present invention, since the hopper gate is closed by the driving force applied by the stepping motor, the hopper gate can be closed at a higher speed than in a case where the hopper gate is closed using only a biasing action of the spring in the conventional configuration. In addition, when the hopper gate is being opened and closed, the follower member (cam follower) of the cam mechanism is in contact with the first cam curved surface and the second cam curved surface of the driver member (cam) of the cam mechanism. Therefore, the controller is able to detect that the stepping motor has lost steps, and hence estimate that the objects are stuck in the hopper gate, when the hopper is opened and closed, based on the output signal of the detecting device capable of detecting the original point of the output shaft of the actuator.

In the mechanism for opening and closing the hopper gate according to an aspect of the present invention, the detecting device and the cam may be mounted to the output shaft of the actuator which is the rotary shaft; and wherein when the objects are stuck in the hopper gate, and a biasing force is applied between the cam and the cam follower to inhibit the output shaft from returning to an original point of the output shaft, corresponding to a position in which the hopper gate is closed, the controller may estimate that the objects are stuck in the hopper gate, based on the output signal of the detecting device.

In the mechanism for opening and closing the hopper gate according to an aspect of the present invention, the detecting device may be a rotary encoder.

In accordance with this configuration, in the mechanism for opening and closing the hopper gate according to an aspect of the present invention, the controller is able to estimate that the objects are stuck in the hopper gate, using an original point detecting mechanism of the rotary encoder capable of performing feedback control of the stepping motor.

In the mechanism for opening and closing the hopper gate according to an aspect of the present invention, the detecting device may be mounted to a pivot of the link mechanism which is the rotary shaft; and wherein when the objects are stuck in the hopper gate, and the cam follower does not contact the first cam curved surface or the second cam curved surface, but forms a free end of the link mechanism, the controller may estimate that the objects are stuck in the hopper gate, based on the output signal of the detecting device.

In the mechanism for opening and closing the hopper gate according to an aspect of the present invention, the detecting device may be an original point sensor.

In accordance with this configuration, in the mechanism for opening and closing the hopper gate according to an aspect of the present invention, even when the objects which are very thin (e.g., potato chips, etc.,) are stuck in the hopper gate (the cam follower does not contact the first cam curved surface or the second cam curved surface, but forms a free end of the link mechanism), the controller can estimate that the objects are stuck in the hopper gate, based on the output signal of the detecting device (e.g., original point sensor). Also, in this case, when the hopper gate is closed, the cam and the cam follower are not in contact with each other, and hence a gap is formed between the cam follower and the cam. Therefore, the cam and the cam follower are apart from each other. This makes it possible to prevent a vibration or the like of a driving system (stepping motor, etc.) of the combination weigher from being transmitted to the load cell via the hopper (e.g., weighing hopper), when the hopper gate is closed. As a result, the weight of the objects held inside of the weighing hopper can be measured appropriately, using the load cell.

The above and further objects, features and advantages of the present invention will more fully be apparent from the following detailed description of preferred embodiments with accompanying drawings.

Advantageous Effects of Invention

In accordance with the present invention, it becomes possible to provide a hopper gate opening/closing mechanism which is able to estimate that objects are stuck in a hopper gate, when the hopper gate is opened and closed using a cam mechanism.

DESCRIPTION OF EMBODIMENTS (Embodiment)

First of all, features of a mechanism for opening and closing a hopper gate (hopper gate opening/closing mechanism) according to an embodiment of the present invention will be described.

The hopper gate opening/closing mechanism according to the present embodiment is a hopper gate opening/closing mechanism for use in a combination weigher which performs combination calculation based on weights of objects to find a combination in which a total of the weights of the objects falls within an allowable range with respect to a target weight. The hopper gate opening/closing mechanism includes an actuator for generating a driving force for opening and closing the hopper gate, a transmission mechanism for transmitting the driving force to the hopper gate, a detecting device capable of detecting an original point of a rotary shaft of the transmission mechanism, the original point corresponding to a position in which the hopper gate is closed; and a controller capable of receiving an output signal of the detecting device.

In accordance with this configuration, as described above, the controller in the hopper gate opening/closing mechanism according to the present embodiment is able to estimate that the objects are stuck in the hopper gate when the hopper gate is opened and closed using the cam mechanism.

Next, an exemplary specific configuration of the hopper gate opening/closing mechanism of the present embodiment will be described with reference to the drawings.

Hereinafter, throughout the drawings, the same or corresponding components (members) are identified by the same reference symbols and will not be described in repetition.

The description given below is merely intended to recite features of the embodiment of the above stated hopper gate opening/closing mechanism. When the wordings which are the same as those which define the hopper gate opening/closing mechanism or the corresponding wordings are designated by reference symbols in description given below, that specific device is an example of the corresponding components of the hopper gate opening/closing mechanism. For example, "output shaft 42 of stepping motor 31" is described as an example of "rotary shaft of transmission mechanism" for defining the hopper gate opening/closing mechanism. However, "rotary shaft of transmission mechanism" is not limited to this. Another example of "rotary shaft of transmission mechanism" will be described in Modified example 1 later.

Therefore, the features of the embodiment of the hopper gate opening/closing mechanism are in no way intended to be limited by description given below.

[Exemplary Configuration of Combination Weigher]

First of all, an outline of an overall configuration of a combination weigher 100 will be described with reference to the drawings.

Figure 1:
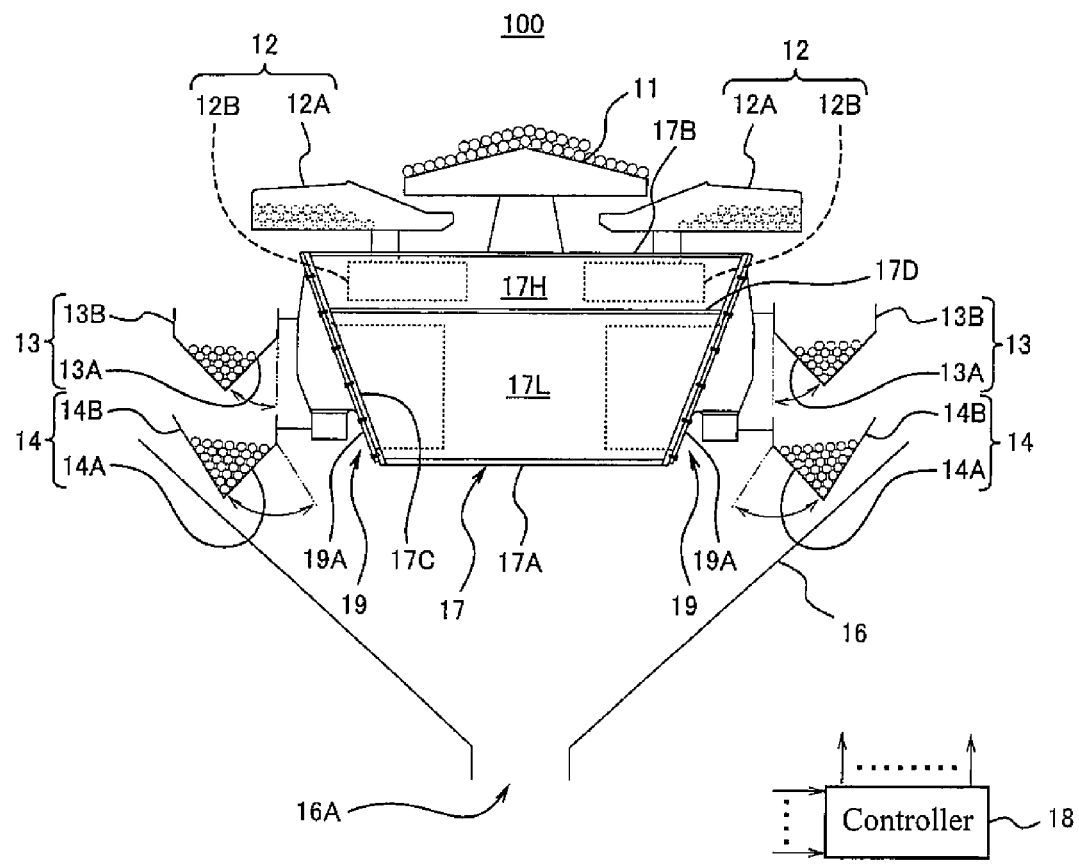
FIG. 1 is a schematic view showing an exemplary combination weigher incorporating a mechanism for opening and closing a hopper gate (hopper gate opening/closing mechanism) according to an embodiment of the present invention.

FIG. 1 is a schematic view showing an exemplary combination weigher incorporating the hopper gate opening/closing mechanism according to the embodiment of the present invention.

As shown in FIG. 1, the combination weigher 100 includes a conical dispersion feeder 11 provided at a center portion of an upper portion of the combination weigher 100 to radially disperse objects supplied from an outside supplying device (not shown), by vibration. Around the dispersion feeder 11, a plurality of linear feeders 12 are arranged in a circular shape. Below the linear troughs 12A of the linear feeders 12, a plurality of feeding hoppers 13 and a plurality of weighing hoppers 14 are provided so as to correspond to the linear feeders 12, respectively, and are arranged in a circular shape around a center base body 17 (body) such that they are spaced apart with a specified spacing from the center base body 17.

The objects sent from the dispersion feeder 11 are vibrated and transported on linear troughs 12A of the linear feeders 12 by vibration of vibration components 12B of the linear feeders 12, respectively, and are sent to the feeding hoppers 13.

Each of the feeding hoppers 13 includes a hopper body 13B and a hopper gate 13A to hold the objects sent from the linear trough 12A of the linear feeder 12, for a specified time, and discharge the objects to the weighing hopper 14 located therebelow. Each of the weighing hoppers 14 includes a hopper body 14B and a hopper gate 14A to hold the objects fed from the feeding hopper 13 located thereabove, for a specified time, and discharge the objects to a collecting chute 16.

The weighing hoppers 14 are coupled to load cells 32 (see FIG. 2) corresponding to the weighing hoppers 41, respectively. The load cells 32 output load signals (electric signals), respectively, to a controller 18.

Below the weighing hoppers 14, the collecting chute 16 of a funnel shape is disposed. The objects selected to make up a discharge combination in the combination weigher 100 are discharged from the weighing hoppers 14 and slide down on and along the collecting chute 16. The objects are discharged to, for example, a packaging machine (not shown) through a discharge outlet 16A at a bottom portion of the collecting chute 16.

The controller 18 includes, for example, a microcontroller including a CPU and memories such as ROM and RAM which contain operation programs, operation parameters, etc., of the CPU. The CPU of the controller 18 executes the operation programs stored in the ROM, to, for example, control an operation of the overall combination weigher 100. That is, the controller 18 controls a vibration amplitude and operation time of each of the dispersion feeder 11 and the linear feeders 12. In addition, the controller 18 controls operations of actuators (stepping motors 31, etc., as will be described later) for opening and closing the hopper gates 13A of the feeding hoppers 13 and the hopper gates 14A of the weighing hoppers 14.

The controller 18 serves as a weight calculating device which receives as inputs the load signals output from the load cells 32 attached with the weighing hoppers 14, and calculates weights of the objects held in the weighing hoppers 14 based on the load signals. In addition, the controller 18 serves as a combination device which performs a combination process. In this combination process, the controller 18 performs combination calculation based on the calculated weights of the objects to find a combination in which a total of the weights of the objects falls within a predetermined weight range (allowable range with respect to a target weight) and is closest to the target weight. And, the controller 18 determines a combination of the weighing hoppers 14 holding the objects therein, corresponding to the combination found in this way, as a discharge combination. Furthermore, the controller 18 serves as a device which estimates that the objects are stuck in the hopper gate 13A of the feeding hopper 13 and a state in which the objects are stuck in the hopper gate 14A of the weighing hopper 14, and its detail will be described later.

The controller 18 causes the hopper gates 14A of the weighing hoppers 14 selected to make up the discharge combination to open and close at predetermined timings, to discharge the objects from the weighing hoppers 14. To the weighing hoppers 14 which have discharged the objects and have been emptied, the feeding hoppers 13 located thereabove feed the objects. To the feeding hoppers 13 which have been emptied, the linear troughs 12A of the linear feeders 12 located thereabove feed the objects.

The controller 18 need not be constituted by a single controller, but may be a plurality of controllers which are placed in a decentralized manner and cooperate with each other to control the operation of the combination weigher 100. Although in the present embodiment, the example in which the weight calculating device, the combination device, and the device which estimates that the objects are stuck are constituted by the single controller 18 is described, the weight calculating device, the combination device and the device which estimates that the objects are stuck, may be constituted by separate controllers (CPUs).

As shown in FIG. 1, in the combination weigher 100, the center base body 17 corresponding to the body of the combination weigher 100 is disposed at a center portion thereof and supported by, for example, four legs (not shown).

The center base body 17 has an external appearance of a substantially inverted truncated pyramid shape having a polygonal cross-section (e.g., inverted truncated pyramid shape having square sides corresponding to the number of the weighing hoppers 14, etc.) and is formed by a lower wall 17A, an upper wall 17B, and a side wall 17C.

As shown in FIG. 1, the combination weigher 100 includes actuator units 19 which open and close the hopper gates 13A of the feeding hoppers 13 and the hopper gates 14A of the weighing hoppers 14. As shown in FIG. 1, the actuator units 19 are mounted to the side wall 17C of the center base body 17.

As shown in FIG. 1, a separating board 17D extending in a horizontal direction to separate an interior of the center base body 17 is disposed inside of the center base body 17.

Thus, the center base body 17 includes a unit accommodating room 17L located at a lower side to accommodate the actuator units 19, and a feeder accommodating room 17H located at an upper side to accommodate the vibration components 12B of the linear feeders 12. As shown in FIG. 1, each of the actuator units 19 has a mounting section 19A extending along the side wall 17C. By providing a suitable fastener device (e.g., screw hole, or the like) in the mounting section 19A, the actuator unit 19 is fastened to the side wall 17C so that a driving unit section of the actuator unit 19 can be accommodated into the unit accommodating room 17L.

In the present embodiment, the hopper gate opening/closing mechanism of the actuator unit 19 has features in its configuration.

Therefore, the features of the configuration will be described in detail with reference to FIG. 2.

[Exemplary Configuration of Hopper Gate Opening/Closing Mechanism]

Figure 2:
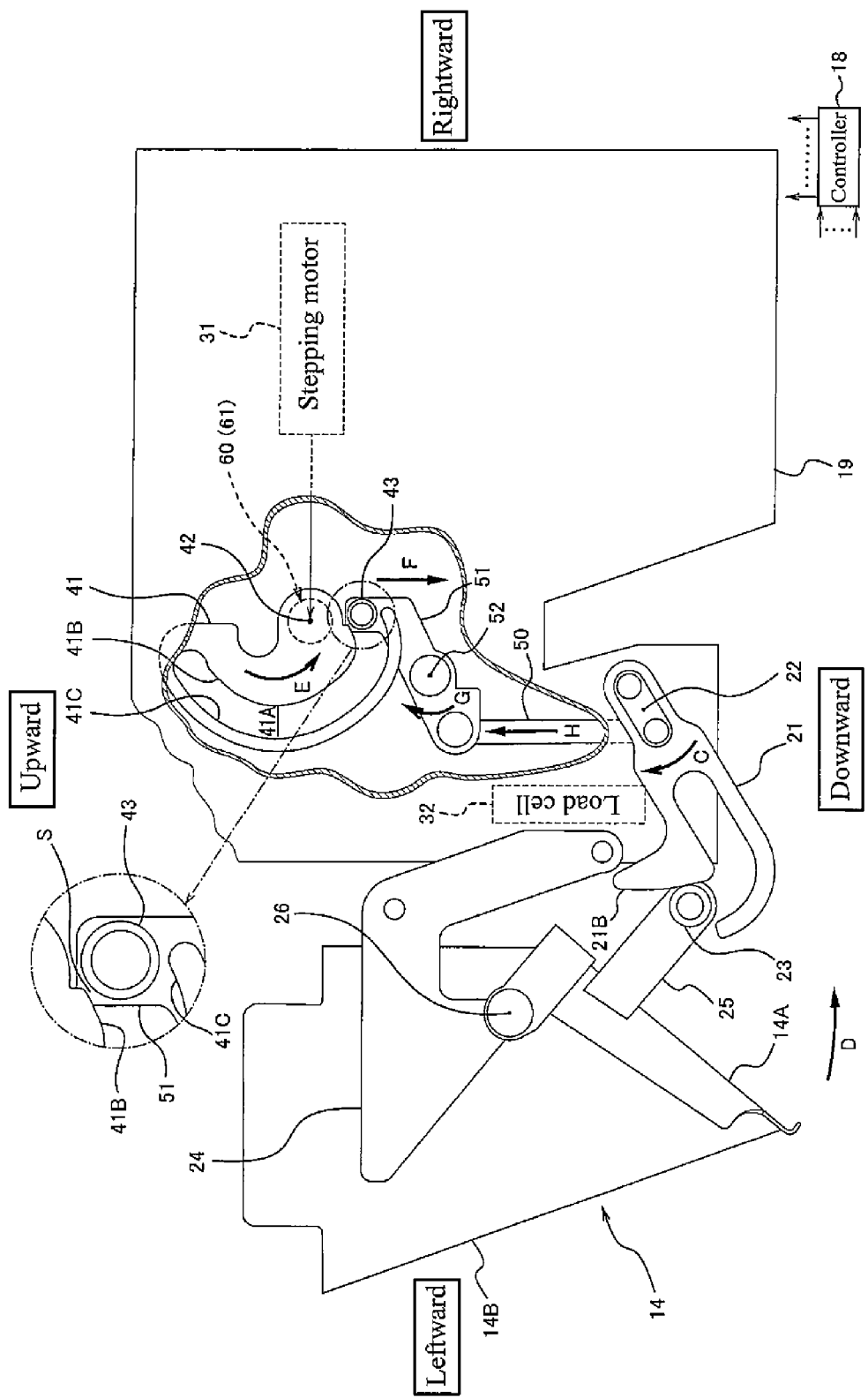
FIG. 2 is a view showing a region surrounding the hopper gate opening/closing mechanism according to the embodiment of the present invention.

FIG. 2 is a view showing a region surrounding the hopper gate opening/closing mechanism according to the embodiment of the present invention.

In FIG. 2, direction in which a gravitational force acts is depicted as "upward/downward", and direction perpendicular to "upward/downward" is depicted as "rightward/leftward." Hereinafter, "upward", "downward", "leftward", and "rightward" will be sometimes used, to describe configuration and operation of the hopper gate opening/closing mechanism.

In FIG. 2, only the hopper gate opening/closing mechanism of the weighing hopper 14 is shown, and the hopper gate opening/closing mechanism of the feeding hopper 13 is not shown.

Although members of a first cam mechanism, members of a link mechanism, members of a second cam mechanism, etc., which will be described below, are placed at each of both sides of the weighing hopper 14 and are configured to form pairs, the members placed at a far side in FIG. 2, of the members forming pairs, are not shown.

As shown in FIG. 2, inside of the actuator unit 19, the stepping motor 31 (actuator) and the load cell 32 coupled to the weighing hopper 14 are placed.

The hopper gate opening/closing mechanism of the weighing hopper 14 includes the first cam mechanism disposed outside of the actuator unit 19, the second cam mechanism disposed inside of the actuator unit 19, and the link mechanism disposed inside of the actuator unit 19.

The first cam mechanism includes a cam 21 and a cam follower 23. The link mechanism includes a first link member 50 and a second link member 51. The second cam mechanism includes a cam 41 and a cam follower 43. These mechanisms constitute a transmission mechanism for transmitting the driving force applied by the stepping motor 31 to the hopper gate 14A of the weighing hopper 14.

As shown in FIG. 2, the hopper gate opening/closing mechanism of the weighing hopper 14 includes the stepping motor 31 for generating the driving force for opening and closing the hopper gate 14A of the weighing hopper 14, a rotary encoder 60 capable of detecting an original point of the output shaft 42 of the stepping motor 31, corresponding to a position in which the hopper gate 14A is closed, and a controller 18 capable of receiving an output signal of the rotary encoder 60. In the present embodiment, the controller 18 serves as the device which estimates that the objects are stuck, and its detail will be described later.

First of all, a detailed configuration of the first cam mechanism of the weighing hopper 14 will be described.

As shown in FIG. 2, the weighing hopper 14 includes the hopper gate 14A supported such that the hopper gate 14A is rotatable around a pivot 26. An actuation plate 25 protrudes from an outer surface of the hopper gate 14A. The cam follower 23 is attached to a tip end portion of the actuation plate 25.

A bracket 24 is coupled to the hopper body 14B of the weighing hopper 14 at the pivot 26 and is mounted to a hanger (not shown) fastened to a wall of the actuator unit 19. This enables the hopper gate 14A of the weighing hopper 14 to be opened and closed in a state in which the hopper body 14B of the weighing hopper 14 is supported.

Outside of the actuator unit 19, a base end portion of the cam 21 is coupled to a pivot 22 at a lower portion of the actuator unit 19 by means of a suitable fastener device (e.g., fastener bolt). The cam follower 23 is in contact with a cam curved surface 21B of a front end portion of the cam 21.

As shown in FIG. 2, in the hopper gate opening/closing mechanism of the weighing hopper 14 of the present embodiment, the front end portion of the cam 21 has a structure in which two elongated portions of a fork-shaped member are curved upward. A surface of this curved portion which faces the cam follower 23 is the cam curved surface 21B.

The hopper gate opening/closing mechanism is configured such that the cam follower 23 is inhibited from rolling on the cam curved surface 21B of the cam 21 in the position (position in FIG. 2) in which the hopper gate 14A is closed.

In other words, a curvature radius of the cam curved surface 21B of the cam 21 is set so that the cam curved surface 21B can restrict a displacement (movement) of the cam follower 23. In this case, the cam curved surface 21B of the cam 21 serves as a stopper section of the hopper gate 14A.

Next, detailed configurations of the second cam mechanism and of the link mechanism of the weighing hopper 14 will be described.

As shown in FIG. 2, the arch-shaped cam 41 of the second cam mechanism is mounted to the output shaft 42 (motor shaft; example of rotary shaft of transmission mechanism) of the stepping motor 31, which is coupled to the stepping motor 31. With this configuration, when the output shaft 42 of the stepping motor 31 rotates around its center portion by the driving force applied by the stepping motor 31, the cam 41 rotates around the center portion of the output shaft 42.

The output shaft 42 of the stepping motor 31 is attached with a rotary plate 61 of the rotary encoder 60. A detailed configuration of the rotary encoder 60 will be described later.

As shown in FIG. 2, in the hopper gate opening/closing mechanism of the weighing hopper 14 of the present embodiment, a hollow region 41A of a strip shape and an arch shape is formed in a peripheral portion of the cam 41. A pair of opposing curved surfaces of the hollow region 41A serve as the first and second cam curved surfaces 41B and 41C of the cam 41 (detailed configuration will be described later). Thus, the second cam mechanism has a double-cam structure.

As shown in FIG. 2, in the link mechanism, the first link member 50 of a plate shape and a strip shape is provided to extend vertically. A lower end of the first link member 50 is coupled to the pivot 22 in a peripheral portion of the pivot 22, while an upper end thereof is coupled to a left end of the second link member 51 of a plate shape and a substantially-Z-shape. The second link member 51 is coupled to a pivot 52 at a center portion thereof. The cam follower 43 is disposed at a right end of the second link member 51.

In this configuration, the second link member 51 rotates around the pivot 52 such that the second link member 51 is displaceable (movable) like a seesaw. This causes the cam follower 43 coupled to the right end of the second link member 51 to be displaced vertically, thereby causing the left end (upper end of the first link member 50) of the second link member 51 to be displaced vertically and in a direction opposite to the displacement direction of the cam follower 43.

The second link member 51 is applied with a biasing force from a suitable biasing device (not shown; for example, spring). In addition, in the position in which the hopper gate 14A is closed, a displacement of the link mechanism of the second link member 51 is inhibited by a suitable stopper device (not shown) so that the cam follower 43 will not contact the cam 41. In this configuration, when the hopper gate 14A is closed, a gap S (see enlarged view of FIG. 2) is formed between the cam 41 and the cam follower 43. As a result, the cam 41 and the cam follower 43 are apart from each other. This makes it possible to prevent a vibration generated in the drive system (stepping motor 31, etc.) of the combination weigher 100 from being transmitted to the load cell 32 via the weighing hopper 14.

[Configuration of Rotary Encoder]

Next, an exemplary configuration of the rotary encoder 60 will be described with reference to the drawings.

Figure 3:
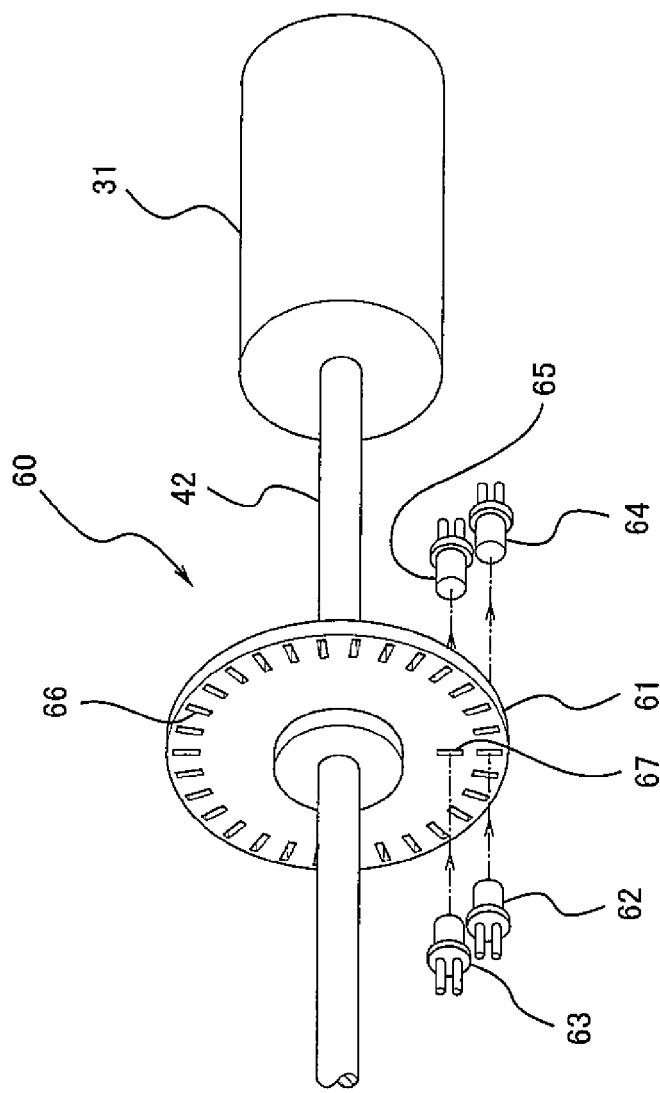
FIG. 3 is a view schematically showing an exemplary configuration of a rotary encoder for use with the hopper gate opening/closing mechanism according to the embodiment of the present invention.

FIG. 3 is a view schematically showing an exemplary configuration of the rotary encoder for use with the hopper gate opening/closing mechanism according to the embodiment of the present invention.

As shown in FIG. 3, the rotary encoder 60 is one kind of sensor which converts a mechanical displacement amount of the rotation of the output shaft 42 of the stepping motor 31 into a digital amount. A rotary plate 61 of the rotary encoder 60 is attached to the output shaft 42 of the stepping motor 31. That is, the rotary encoder 60 includes the rotary plate 61 of a disc shape which is rotatable together with the output shaft 42, a pair of light emitting elements 62 and 63, and a pair of light receiving elements 64 and 65.

As shown in FIG. 3, many small slits 66 for a stepping motor control signal are formed in a peripheral portion of the rotary plate 61 at small equal intervals along a periphery of the rotary plate 61. These slits 66 are arranged on the rotary plate 61 so that light emitted from the light emitting element 62 can intermittently pass through each of the slits 66 when the rotary plate 61 is rotating. During rotation of the rotary plate 61, every time the emitted light passes through the slit 66, it enters the light receiving element 64, which detects a pulse signal, and outputs the detected pulse signal to the controller 18.

Thus, the controller 18 receives the pulse signal (output signal of the light receiving element 64) detected by the light receiving element 64. The controller 18 is able to measure a rotational angle of the output shaft 42 of the stepping motor 31, and hence perform feedback control of the stepping motor 31, based on the pulse signal. That is, the controller 18 controls the stepping motor 31 so that a pulse input to the stepping motor 31 is synchronized with the rotation of the output shaft 42 of the stepping motor 31 (e.g., the output shaft 42 of the stepping motor 31 rotates about 0.9 degree for each pulse input to the stepping motor 31). At this time, the controller 18 detects the rotational angle of the output shaft 42 as the pulse signal, and associates (feeds back) the detected value with a rotational motion of the output shaft 42, thereby maintaining the rotational motion of the output shaft 42 at a predetermined value.

As shown in FIG. 3, a small slit 67 for an original point signal is formed in a suitable location between the peripheral portion of the rotary plate 61 and a center portion thereof. This slit 67 is positioned on the rotary plate 61 so that the light emitted from the light emitting element 63 can pass through the slit 67 once per rotation of the rotary plate 61. In this configuration, during rotation of the rotary plate 61, every time the rotary plate 61 rotates once, the emitted light enters the light receiving element 65, the light receiving element 65 detects a pulse signal, and the light receiving element 64 outputs the detected pulse signal to the controller 18. In this way, this pulse signal is generated only once per rotation of the rotary plate 61, and therefore can be used to detect the original point with respect to the rotation of the rotary plate 61.

To this end, in the present embodiment, the position of the slit 67 is set so that the position in which the hopper gate 14A is closed corresponds to the original point with respect to the rotation of the rotary plate 61. In this configuration, the controller 18 receives the signal detected by the light receiving element 65 (output signal of the light receiving element 65), and can detect the original point of the output shaft 42 (i.e., original point with respect to the rotation of the rotary plate 61) corresponding to the position in which the hopper gate 14A is closed, based on this signal.

It should be noted that when the output shaft 42 of the stepping motor 31 is in the original point, there exists a small backlash corresponding to the gap S between the cam follower 43 and the cam 41. Therefore, in the present specification, the term "original point of the output shaft 42 of the stepping motor 31" refers to a region including a variation in the rotation of the output shaft 42 which is caused by the backlash.

[Exemplary Operation of Hopper Gate Opening/Closing Mechanism]

Next, an exemplary operation of the hopper gate opening/closing mechanism of the weighing hopper 14 will be described in detail with reference to the drawings. Since the operation of the hopper gate opening/closing mechanism of the feeding hopper 13 will be easily understood from the following description, it is omitted in the present embodiment.

Figure 4B:
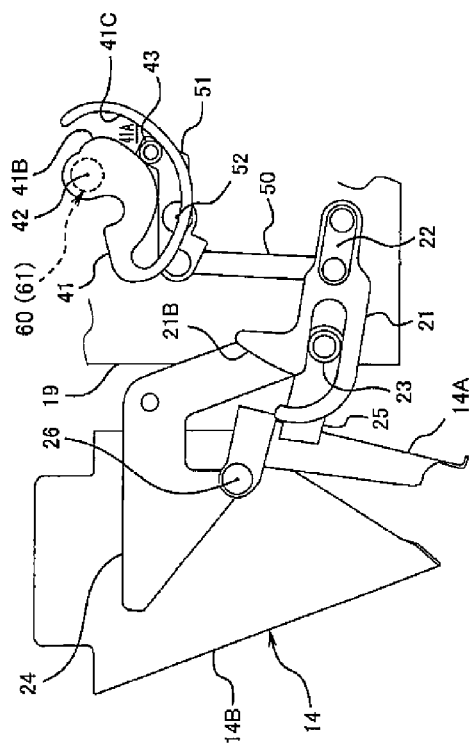
FIG. 4 is a view used to describe an operation of the hopper gate opening/closing mechanism of FIG. 2.
Figure 4C:
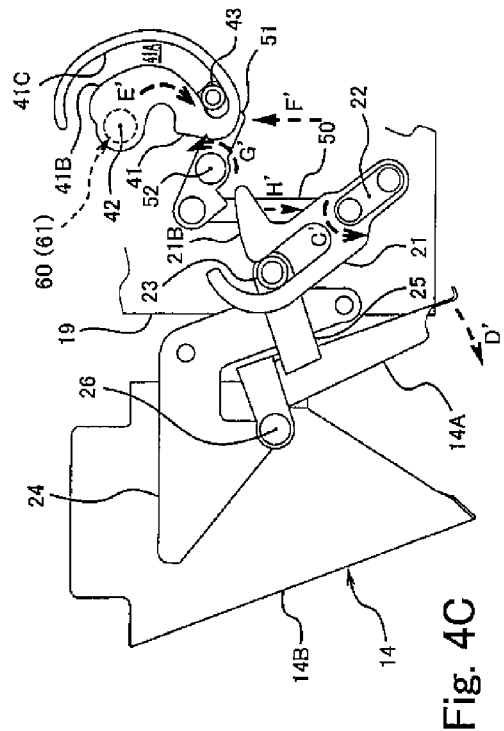
Figure 4A:
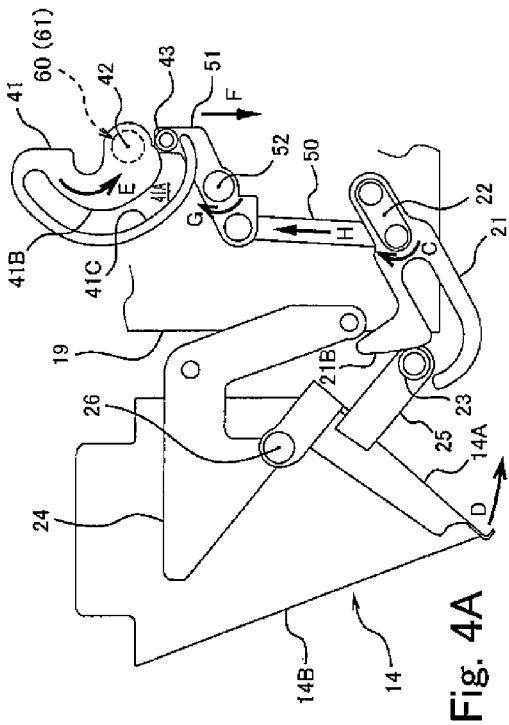

FIG. 4 is a view used to describe the operation of the hopper gate opening/closing mechanism of the weighing hopper 14 of FIG. 2.

As shown in FIGS. 2 and 4, when the cam 41 of the second cam mechanism rotates in a direction of an arrow E around the center portion of the output shaft 42 by the driving force applied by the stepping motor 31, the cam follower 43 enters the hollow region 41A between the first cam curved surface 41B and the second cam curved surface 41C, while rolling in the hollow region 41A. That is, the cam 41 is configured to guide the cam follower 43 to the hollow region 41A when the hopper gate 14A is being opened and closed.

At this time, the cam follower 43 contacts the first cam curved surface 41B of the cam 41, and thereby a protruding portion of the first cam curved surface 41B applies to the cam follower 43 a biasing force which can exceed the biasing force of the spring, by the driving force applied by the stepping motor 31. As a result, the protruding portion of the first cam curved surface 41B can forcibly push the cam follower 43 downward. In this way, the cam follower 43 is displaced (moved) in a direction of an arrow F (i.e., the cam follower 43 is displaced vertically downward).

Thereby, the second link member 51 rotates in a direction of an arrow G around the pivot 52. In other words, the second link member 51 is displaced clockwise like a seesaw. Thereby, the first link member 50 is displaced in a direction of an arrow H (i.e., displaced vertically upward).

When the first link member 50 is displaced in the direction of the arrow H, the cam 21 can rotate in a direction of an arrow C around the center portion of the pivot 22.

Thereby, the cam follower 23 rolls on the first cam curved surface 21B, and as a result, the hopper gate 14A is pivoted in a direction of an arrow D around the pivot 26. In this way, the hopper gate 14A is opened.

That is, the second cam mechanism can convert the rotational motion of the stepping motor 31 into a linear motion of the first link member 50 of the link mechanism, while the first cam mechanism can convert the linear motion of the first link member 50 of the link mechanism into an opening/closing motion of the hopper gate 14A.

On the other hand, in an open state (see FIG. 4C) of the hopper gate 14A, when the cam 41 rotates in a direction E' opposite to the arrow E around the center portion of the output shaft 42 by the driving force applied by the stepping motor 31, the cam follower 43 recedes from the hollow region 41A between the first cam curved surface 41B and the second cam curved surface 41C, while rolling in the hollow region 41A.

At this time, the cam follower 43 contacts the second cam curved surface 41C of the cam 41, and thereby the second cam curved surface 41C applies to the cam follower 43 a biasing force complementing a biasing action of the spring by the driving force applied by the stepping motor 31. As a result, the second cam curved surface 41C can forcibly push the cam follower 43 upward. This causes the cam follower 43 to be displaced in a direction F' opposite to the arrow F (i.e., displaced vertically upward). This causes the second link member 51 to rotate in a direction G' opposite to the arrow G around the pivot 52. In other words, the second link member 51 is displaced counterclockwise like a seesaw. This causes the first link member 50 to be displaced in a direction H' opposite to the arrow H (i.e., displaced vertically downward).

Since the first link member 50 is displaced in the direction H' opposite to the arrow H, the cam 21 can rotate in a direction C' opposite to the arrow C around the center portion of the pivot 22.

Thereby, the cam follower 23 rolls on the cam curved surface 21B of the cam 21, and as a result, the hopper gate 14A is pivoted in a direction D' opposite to the arrow D around the pivot 26. In this way, the hopper gate 14A is closed.

That is, the second cam mechanism can convert the rotational motion of the stepping motor 31 into a linear motion of the first link member 50 of the link mechanism, while the first cam mechanism can convert the linear motion of the first link member 50 of the link mechanism into the opening/closing motion of the hopper gate 14A.

As described above, the first cam mechanism of the hopper gate opening/closing mechanism is configured such that the cam follower 23 and the cam 21 also serve as the stopper section of the hopper gate 14A. The cam follower 23 corresponds to a follower member of the first cam mechanism, while the cam 21 corresponds to a driver member of the first cam mechanism.

Also, the second cam mechanism of the hopper gate opening/closing mechanism is configured such that the cam follower 43 and the cam 41 allow the hopper gate 14A to be forcibly opened and closed by the driving force applied by the stepping motor 31. The cam follower 43 corresponds to a follower member of the second cam mechanism, while the cam 41 corresponds to a driver member of the second cam mechanism.

As should be understood from the foregoing description regarding the configuration and operation of the hopper gate opening/closing mechanism of the present embodiment, the hopper gate opening/closing mechanism can achieve various advantages as described below.

Firstly, in the hopper gate opening/closing mechanism of the present embodiment, the first and second cam mechanisms cooperate with each other to enable the hopper gate 14A to be appropriately opened and closed by the driving force applied by the stepping motor 31.

Specifically, the first cam mechanism (cam curved surface 21B of cam 21) inhibits the hopper gate 14A from being opened in the position in which the hopper gate 14A is closed. Therefore, in the hopper gate opening/closing mechanism, using the first cam mechanism as the stopper section of the hopper gate 14A, the special mechanism (e.g., conventional toggle link mechanism, etc.) for locking and unlocking in the conventional stopper section becomes unnecessary. Hence, it becomes possible to avoid an increase in motor torque of the stepping motor 31 which would be caused by the locking and unlocking in the conventional stopper section. Moreover, since the number of components of the stopper section of the hopper gate 14A can be reduced, the configuration of the stopper section can be simplified.

On the other hand, in the open state of the hopper gate 14A, when the cam 41 rotates in a direction E' opposite to the arrow E around the center portion of the output shaft 42 by the driving force applied by the stepping motor 31, the second cam mechanism (second cam curved surface 41C of cam 41) and the cam follower 43 contact each other, thereby allowing the cam follower 43 to be forcibly pushed upward. In this way, in the hopper gate opening/closing mechanism of the present embodiment, the hopper gate 14A is closed by the driving force applied by the stepping motor 31. Therefore, the hopper gate 14A can be closed at a higher speed than in a case where the hopper gate is closed, using only the biasing action of the spring in the conventional configuration.

Secondary, the controller 18 in the hopper gate opening/closing mechanism of the present embodiment is able to estimate that the objects are stuck in the hopper gate 14A when the hopper gate 14A is opened and closed using the second cam mechanism, by cooperating the rotary encoder 60 and the second cam mechanism with each other.

As described above, in the hopper gate opening/closing mechanism of the present embodiment, when the hopper gate 14A is opened, the biasing force is applied between the cam 41 (first cam curved surface 41B) and the cam follower 43, while when the hopper gate 14A is closed, the biasing force is applied between the cam 41 (second cam curved surface 41C) and the cam follower 43. That is, when the hopper gate 14A is being opened and closed, the cam follower 43 is in contact with the first cam curved surface 41B of the cam 41 and the second cam curved surface 41C of the cam 41.

With this configuration, when the objects are stuck in the hopper gate 14A, the pulse input to the stepping motor 31 and the rotation of the output shaft 42 of the stepping motor 31 get out of synchronization (i.e., stepping motor 31 has lost steps). In this way, the controller 18 is able to detect that the stepping motor 31 has lost steps, and hence estimate that the objects are stuck in the hopper gate 14A, based on the output signal of the rotary encoder 60.

More specifically, in a case where the objects are caught between the hopper gate 14A and the hopper body 14B, and thereby they are stuck in the hopper gate 14A, the cam follower 43 and the first cam curved surface 41B contact each other, so that the cam 41 cannot return to the state corresponding to the position in which the hopper gate 14A is closed.

In other words, in a case where the objects are stuck in the hopper gate 14A, since the biasing force is applied between the second cam curved surface 41C of the cam 41 and the cam follower 43, the output shaft 42 of the stepping motor 31 is inhibited from returning to the original point of the output shaft 42, corresponding to the position in which the hopper gate 14A is closed, even though an original point return pulse of the output shaft 42 is input to the stepping motor 31. This causes the stepping motor 31 to lose steps.

As should be appreciated, in the hopper gate opening/closing mechanism of the present embodiment, in a case where the objects are stuck in the hopper gate 14A, the light receiving element 65 of the rotary encoder 60 does not detect the signal, even when the controller 18 controls the stepping motor 31 to cause the hopper gate 14A to be closed. This enables the controller 18 to detect that the output shaft 42 has not returned to the original point of the output shaft 42, corresponding to the position in which the hopper gate 14A is closed, based on the output signal of the rotary encoder 60, when the hopper gate 14A is closed. As a result, the controller 18 can estimate that the objects are stuck in the hopper gate 14A, based on the output signal of the rotary encoder 60.

Thirdly, in the hopper gate opening/closing mechanism of the present embodiment, when the hopper gate 14A is closed, the cam 41 and the cam follower 41 are not in contact with each other and hence the gap S is formed between the cam follower 43 and the cam 41. Therefore, the cam follower 43 and the cam 41 are apart from each other. This makes it possible to prevent a vibration or the like of a driving system (stepping motor 31, etc.) of the combination weigher 100 from being transmitted to the load cell 32 via the weighing hopper 14. As a result, the weight of the objects inside of the weighing hopper 14 can be measured appropriately, using the load cell 32.

Although diagrammatic representation and detailed configuration of the hopper gate opening/closing mechanism of the feeding hopper 13 are omitted, the hopper gate opening/closing mechanism of the feeding hopper 13 has the same configuration as that of the hopper gate opening/closing mechanism of the weighing hopper 13 and has the same advantages as those of the hopper gate opening/closing mechanism of the weighing hopper 13. However, the feeding hopper 13 is not connected to the load cell 32, and therefore the cam of the second cam mechanism and the cam follower need not be always made apart from each other (as will be described in detail later).

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention. For example, the following modified examples may be employed.

[Modified Example 1]

In the described example of the hopper gate opening/closing mechanism of the present embodiment, the rotary encoder 60 detects the original point of the output shaft 42 of the stepping motor 31, corresponding to the position in which the hopper gate 14A is closed, and the controller 18 is able to estimate that the objects are stuck in the hopper gate 14A, based on the output signal of the rotary encoder 60. However, this method has the following drawback.

As described above, when the output shaft 42 of the stepping motor 31 is in the original point, there exists a small backlash corresponding to the gap S between the cam follower 43 and the cam 41. Therefore, in some cases, if the objects which are very thin (e.g., potato chips, etc.) are stuck in the hopper gate 14A, the rotary plate 61 of the rotary encoder 60 does not rotate because of the presence of the backlash, and the controller 18 cannot appropriately estimate that the objects are stuck in the hopper gate 14A. In other words, in a case where the objects are stuck in the hopper gate 14A, the cam follower 43 does not contact the first cam curved surface 41B or the second cam curved surface 41C, but forms a free end of the link mechanism.

As a solution to this, in the hopper gate opening/closing mechanism of the present modified example, in addition to the rotary encoder 60, an original point sensor capable of detecting the position in which the hopper gate 14A is closed, is provided. This can obviate the above stated drawback.

Figure 5:
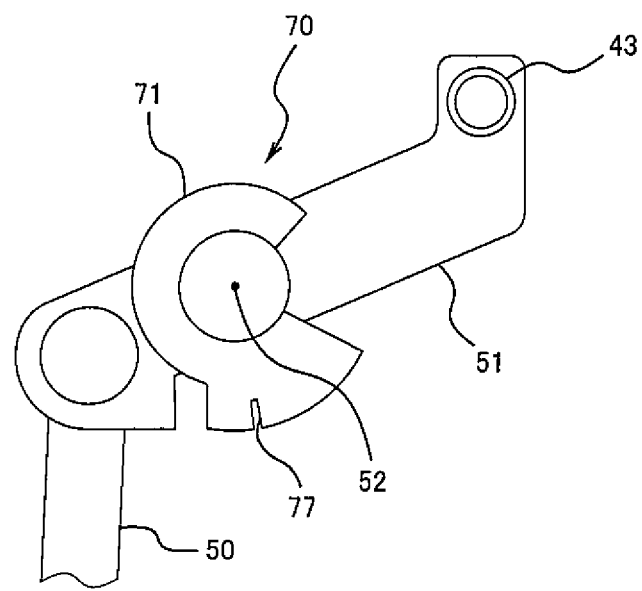
FIG. 5 is a view showing an example of major components of a hopper gate opening/closing mechanism according to modified example 1.

FIG. 5 is a view showing an example of major components of a hopper gate opening/closing mechanism according to modified example 1.

As shown in FIG. 5, the hopper gate opening/closing mechanism according to the present modified example includes an original point sensor 70, and a rotary plate 71 of the original point sensor 70 is mounted to the pivot 52 of the link mechanism. Specifically, the original point sensor 70 includes the rotary plate 71 which is rotatable together with the pivot 52, a light emitting element (not shown), and a light receiving element (not shown). As shown in FIG. 5, one small slit 77 for an original point detection signal is formed in a peripheral portion of the rotary plate 71. The slit 77 is disposed on the rotary plate 71 so that light emitted from the light emitting element can pass through the slit 77 in the position in which the hopper gate 14A is closed. When the hopper gate 14A has been closed, the emitted light enters the light receiving element, which detects a signal, and as a result, outputs the detected signal to the controller 18. Thus, the controller 18 receives the signal (output signal of the light receiving element) detected by the light receiving element. Based on the received signal, the controller 18 can detect the original point of the pivot 52 of the link mechanism, corresponding to the position in which the hopper gate 14A is closed. In other words, the controller 18 detects the position in which the hopper gate 14A is closed, as the above signal. Based on this signal, the controller 18 can detect the original point of the output shaft 42, corresponding to the position in which the hopper gate 14A is closed.

In the above configuration, when the pivot 52 of the link mechanism is in the original point, the backlash or the like which exists when the output shaft 42 is in the original point does not exist. Therefore, even when the objects which are very thin (e.g., potato chips, etc.) are stuck in the hopper gate 14A (i.e., the cam follower 43 does not contact the first cam curved surface 41B or the second cam curved surface 41C, but forms a free end of the link mechanism), the controller 18 can estimate that the objects are stuck in the hopper gate 14A, based on the output signal of the original point sensor 70.

Although in the present modified example, the rotary plate 71 of the original point sensor 70 is mounted to the pivot 52 of the link mechanism, the present invention is not limited to this.

For example, a rotary plate (not shown) of a sensor which is of the same kind as that of the original point sensor 70 may be mounted to the pivot 22 (see FIG. 2) of the cam 21. This configuration can achieve the same advantages as those described above.

Instead of the original point sensor 70, a rotary plate (not shown) of an encoder which is of the same kind as that of the rotary encoder 60 (see FIG. 3) may be mounted to the pivot 52 or the pivot 22. This configuration can achieve the same advantages as those described above.

[Modified Example 2]

Although in the hopper gate opening/closing mechanism of the weighing hopper 14 of the present embodiment, the hopper gate 14A of the weighing hopper 14 is configured to be opened in a direction which is counterclockwise, the present invention is not limited to this. For example, the weighing hopper may include a pair of hopper gates, one of the pair of hopper gates may be opened clockwise and the other of the pair of hopper gates may be opened counterclockwise, using the hopper gate opening/closing mechanism. In this case, the output shaft 42 of the stepping motor 31 may be coupled to each of the pair of hopper gates by means of a suitable coupling member (not shown). This enables the controller 18 to estimate that the objects are stuck in each of the pair of hopper gates, using a single rotary encoder 60.

[Modified Example 3]

In the hopper gate opening/closing mechanism of the weighing hopper 14 of the present embodiment, the front end portion of the cam 21 has a structure in which two elongated portions of a fork-shaped member are curved upward. Also, the hollow region 41A of a strip shape and an arch shape is formed in the peripheral portion of the arch-shaped cam 41. However, the shapes of the cam 21 and of the cam 41 are not limited to these.

For example, a disc member may be processed to have a curved surface of the same shape as that of the cam curved surface 21B of the cam 21. This disc member may be used as a cam in place of the cam 21. Or, the disc member may be processed to have a curved surface of the same shape as that of the hollow region 41A of the cam 41. This disc member may be used as a cam in place of the cam 41.

In these cases, however, the above stated disc members are greater in weight than the cam 21 and the cam 41 as described in the present embodiment, and therefore are more likely to cause an increase in a motor torque of the stepping motor 31 than the hopper gate opening/closing mechanism of the present embodiment.

[Modified Example 4]

Although in the present embodiment, the hopper gate opening/closing mechanism of the weighing hopper 14 is exemplarily described, the present invention is not limited to this.

For example, in a case where the combination weigher includes memory hoppers, the hopper gate opening/closing mechanism of the present embodiment is applicable to opening and closing the hopper gates of the memory hoppers.

INDUSTRIAL APPLICABILITY

The present invention provides a hopper gate opening/closing mechanism which is able to estimate that objects are stuck in a hopper gate, when the hopper gate is opened and closed using a cam mechanism. Therefore, the present invention can be used in hopper gate opening/closing mechanisms of various combination weighers used to weigh objects.

REFERENCE SIGNS LIST

11 dispersion feeder
12 linear feeder
12A linear trough
12B vibration component
13 feeding hopper
13A hopper gate of feeding hopper
13B hopper body of feeding hopper
14 weighing hopper
14A hopper gate of weighing hopper
14B hopper body of weighing hopper
16 collecting chute
16A discharge outlet
17 center base body (body)
17A lower wall
17B upper wall
17C side wall
17D separating board
17H feeder accommodating room
17D unit accommodating room
18 controller
19 actuator unit
19A mounting section
21 cam of first cam mechanism
21B cam curved surface of first cam mechanism
22 pivot of cam of first cam mechanism
23 cam follower of first cam mechanism
24 bracket
25 actuation plate of weighing hopper
26 pivot of weighing hopper
31 stepping motor
32 load cell
41 cam of second cam mechanism
41A hollow region
41B first cam curved surface of cam of second cam mechanism
41C second cam curved surface of cam of second cam mechanism
42 output shaft
43 cam follower of second cam mechanism
50 first link member 51 second link member
52 pivot of link mechanism
60 rotary encoder
61 rotary plate of rotary encoder
62, 63 light emitting element
64, 65 light receiving element
66, 67 slit of rotary encoder
70 original point sensor
71 rotary plate of original point sensor
77 slit of original point sensor
100 combination weigher

The invention claimed is:

1. A mechanism for opening and closing a hopper gate which is used in a combination weigher which performs combination calculation based on weights of objects, to find a combination in which a total of the weights of the objects falls within an allowable range with respect to a target weight, the mechanism for opening and closing the hopper gate comprising:
   an actuator for generating a driving force for opening and closing the hopper gate;
   a transmission mechanism for transmitting the driving force to the hopper gate;
   a detecting device capable of detecting an original point of a rotary shaft of the transmission mechanism, the original point corresponding to a position in which the hopper gate is closed;
   a controller capable of receiving an output signal of the detecting device;
   wherein the transmission mechanism includes a cam mechanism for converting a rotational motion of the actuator into a linear motion of a link mechanism;
   wherein a driver member of the cam mechanism is mounted to an output shaft of the actuator which is coupled to the actuator;
   wherein a follower member of the cam mechanism is mounted to the link mechanism; and
   wherein the driver member includes a first cam curved surface used to transmit the driving force to the follower member when the hopper gate is opened and a second cam curved surface used to transmit the driving force to the follower member when the hopper gate is closed.

2. The mechanism for opening and closing the hopper gate according to claim 1,
   wherein a cam follower is used as the follower member, and a cam with which the cam follower contacts is used as the driver member; and
   wherein the cam is configured to guide the cam follower to a region between the first cam curved surface and the second cam curved surface, when the hopper gate is being opened and closed.

3. The mechanism for opening and closing the hopper gate according to claim 2,
   wherein the detecting device and the cam are mounted to the output shaft of the actuator which is the rotary shaft; and
   wherein when the objects are stuck in the hopper gate, and a biasing force is applied between the cam and the cam follower to inhibit the output shaft from returning to an original point of the output shaft, corresponding to a position in which the hopper gate is closed, the controller estimates that the objects are stuck in the hopper gate, based on the output signal of the detecting device.

4. The mechanism for opening and closing the hopper gate according to claim 3, wherein the detecting device is a rotary encoder.

5. The mechanism for opening and closing the hopper gate according to claim 2,
   wherein the detecting device is mounted to a pivot of the link mechanism which is the rotary shaft; and
   wherein when the objects are stuck in the hopper gate, and the cam follower does not contact the first cam curved surface or the second cam curved surface, but forms a free end of the link mechanism, the controller estimates that the objects are stuck in the hopper gate, based on the output signal of the detecting device.

6. The mechanism for opening and closing the hopper gate according to claim 5,
   wherein the detecting device is an original point sensor.

* * * * *